United States Patent
Kim et al.

(10) Patent No.: US 11,382,104 B2
(45) Date of Patent: Jul. 5, 2022

(54) METHOD FOR TRANSMITTING DATA IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 101 days.

(21) Appl. No.: 16/762,110

(22) PCT Filed: Nov. 6, 2018

(86) PCT No.: PCT/KR2018/013352
§ 371 (c)(1),
(2) Date: May 6, 2020

(87) PCT Pub. No.: WO2019/088794
PCT Pub. Date: May 9, 2019

(65) Prior Publication Data
US 2020/0337055 A1 Oct. 22, 2020

Related U.S. Application Data

(60) Provisional application No. 62/582,259, filed on Nov. 6, 2017.

(51) Int. Cl.
*H04W 72/04* (2009.01)
*H04W 76/11* (2018.01)
(Continued)

(52) U.S. Cl.
CPC ...... *H04W 72/0493* (2013.01); *H04B 7/0626* (2013.01); *H04L 5/0051* (2013.01);
(Continued)

(58) Field of Classification Search
CPC ............. H04W 72/0493; H04W 76/11; H04W 72/042; H04W 72/0446; H04W 72/0466;
(Continued)

(56) References Cited

U.S. PATENT DOCUMENTS

2018/0323897 A1* 11/2018 Arnott ................. H04J 13/0022
2021/0242995 A1* 8/2021 Noh ....................... H04L 5/0051

FOREIGN PATENT DOCUMENTS

WO 2017077705 5/2017

OTHER PUBLICATIONS

CMCC, "Discussion on group scheduling mechanisms", 3GPP TSG RAN WG1 #103-e R1-2008034 e-Meeting, Oct. 26-Nov. 13, 2020 (Year: 2020).*

(Continued)

*Primary Examiner* — Thinh D Tran
(74) *Attorney, Agent, or Firm* — Lee Hong Degerman Kang Waimey

(57) ABSTRACT

The present specification provides a method for transmitting data in a wireless communication system. More specifically, a method performed by a base station comprises the steps of: scrambling bits constituting at least one codeword by using a scrambling sequence; and transmitting, to a mobile station, data including the scrambled bits on a physical channel, wherein an initial value of the scrambling sequence is determined on the basis of a value calculated by floor calculation of a slot index and the number of slots in a radio frame. Due to these features, the initial value of the scrambling sequence can be kept the same during a specific time interval.

6 Claims, 6 Drawing Sheets

(51) Int. Cl.
   *H04B 7/06*   (2006.01)
   *H04L 5/00*   (2006.01)
(52) U.S. Cl.
   CPC ..... *H04W 72/042* (2013.01); *H04W 72/0446* (2013.01); *H04W 72/0466* (2013.01); *H04W 76/11* (2018.02)
(58) Field of Classification Search
   CPC .... H04W 72/04; H04B 7/0626; H04L 5/0051; H04L 5/0044
   See application file for complete search history.

(56) References Cited

OTHER PUBLICATIONS

LG Electronics, "Discussion on data scrambling in NR ," 3GPP TSG-RAN WG1 Meeting NR#3, R1-1715893, Sep. 2017, 2 pages.
Huawei, HiSilicon, "On data channel scrambling ," 3GPP TSG RAN WG1 Meeting #90bis, R1-1717059, Oct. 2017, 3 pages.
Ericsson, "Scrambling for data channels," 3GPP TSG RAN WG1 Meeting #90bis, R1-1718428, Oct. 2017, 3 pages.
3rd Generation Partnership Project (3GPP), "Technical Specification Group Radio Access Network; Evolved Universal Terrestrial Radio Access (E-UTRA); Physical channels and modulation (Release 14)," 3GPP TS 36.211 V14.4.0, Sep. 2017, 155 pages.
PCT International Application No. PCT/KR2018/013352, International Search Report dated Feb. 26, 2019, 4 pages.

* cited by examiner

[FIG. 1]
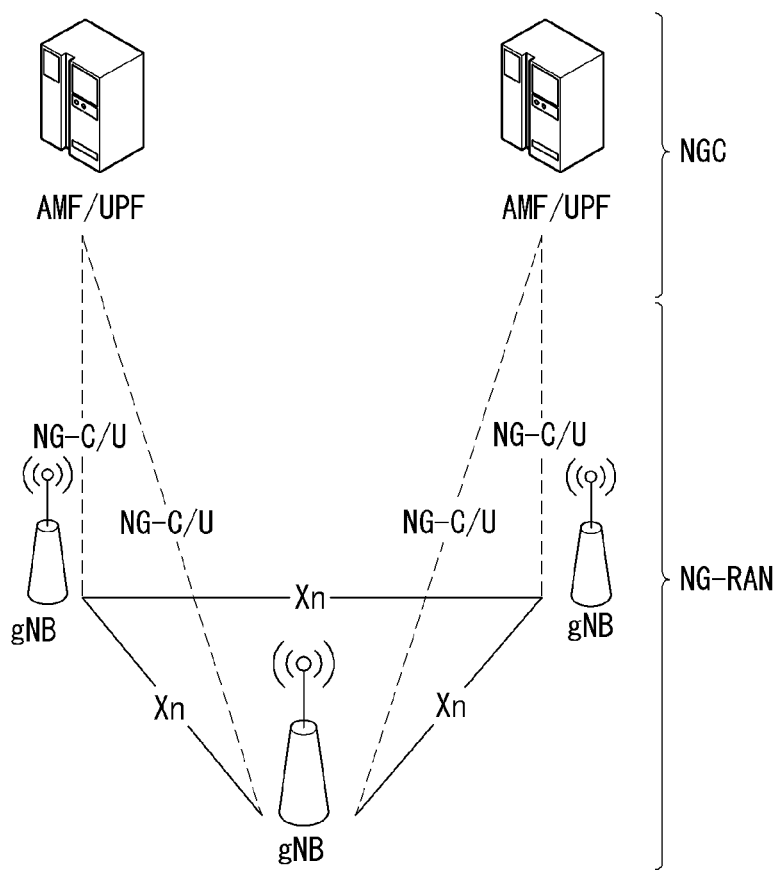
[FIG. 2]
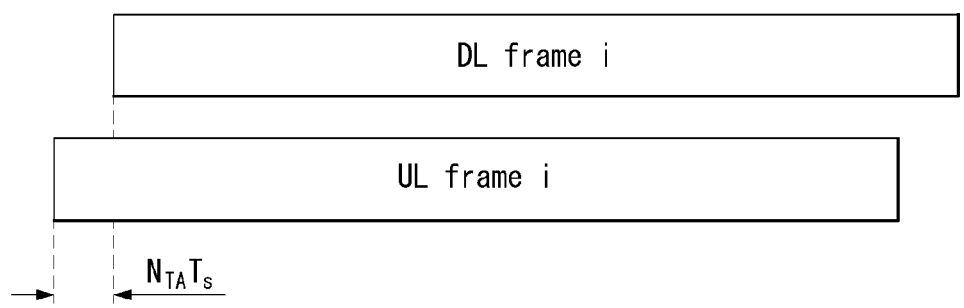

[FIG. 3]
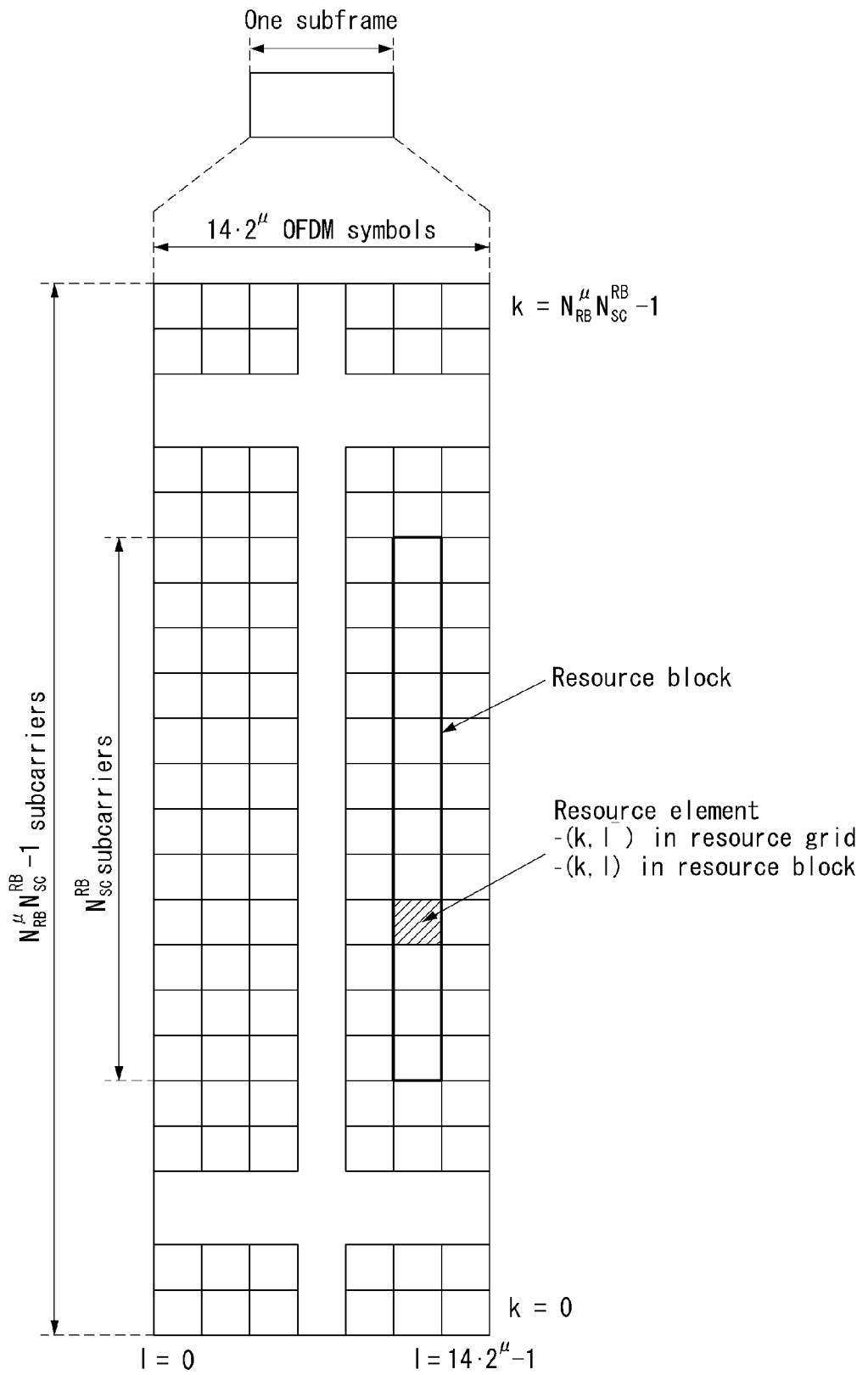

[FIG. 4]
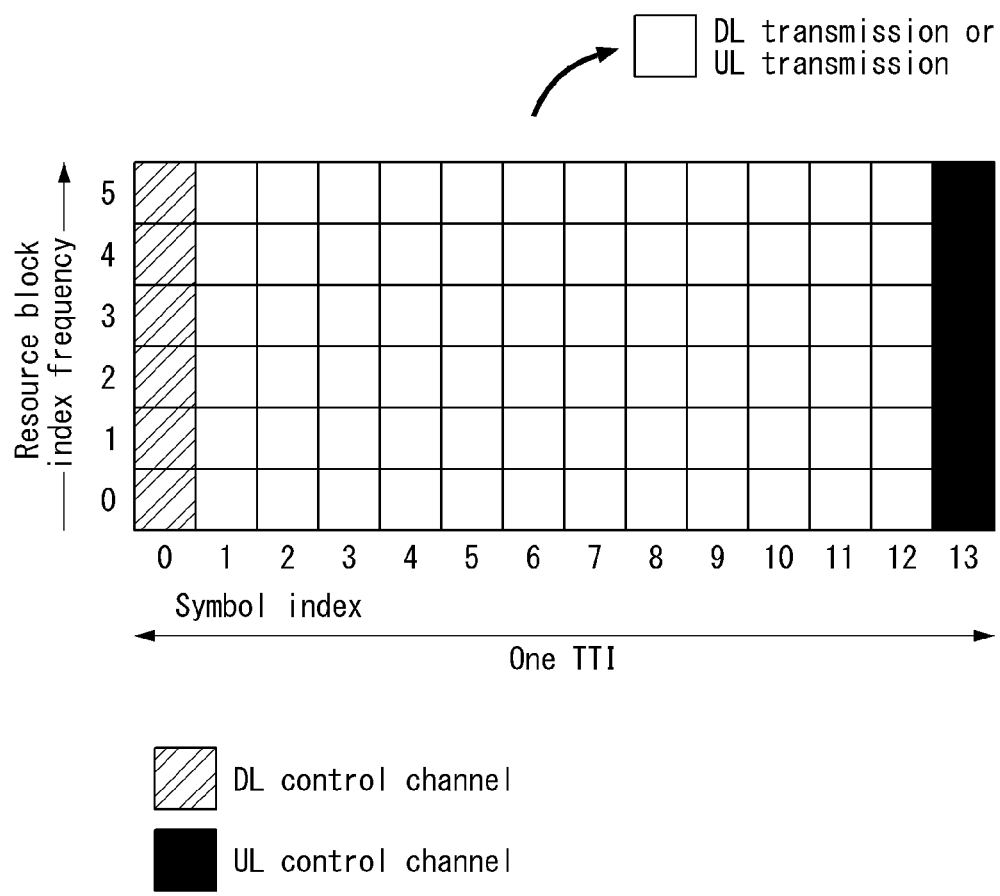

[FIG. 7]
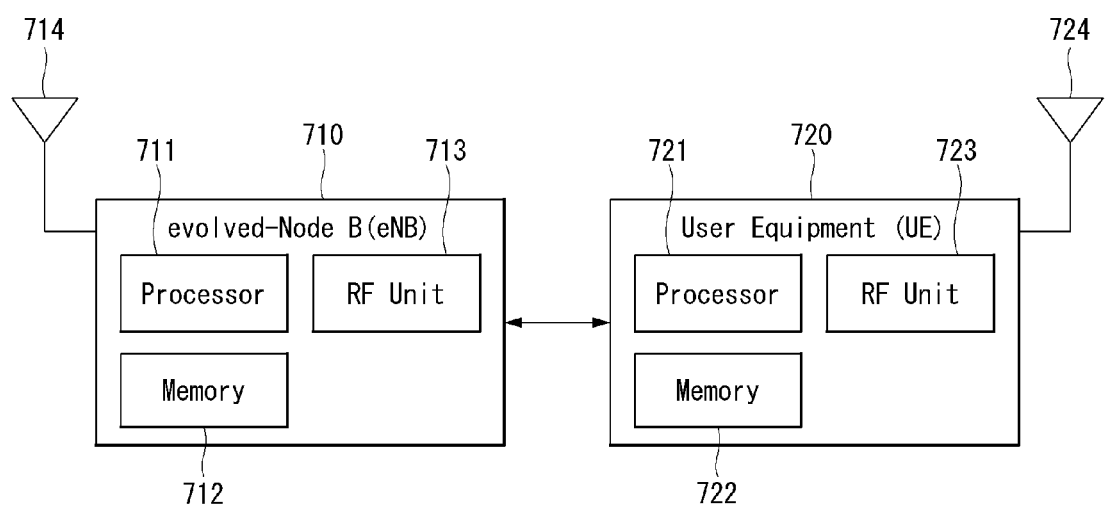

【FIG. 8】
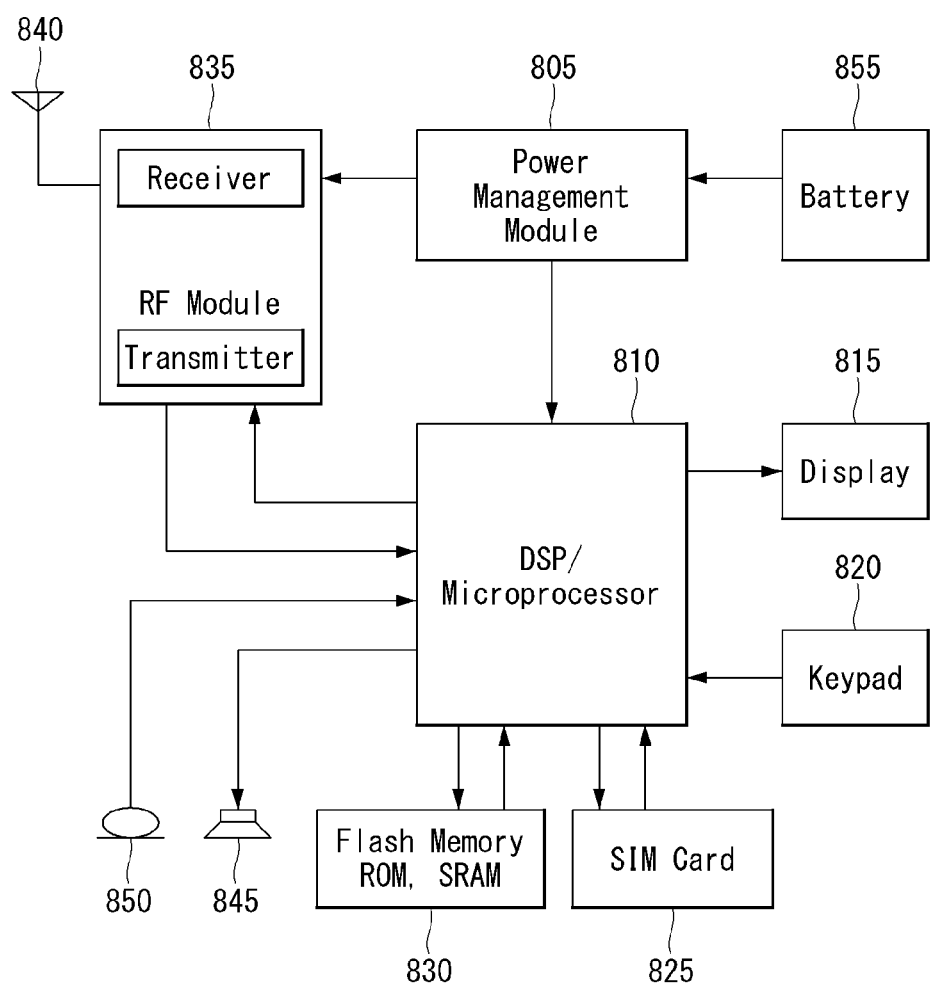

METHOD FOR TRANSMITTING DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/013352, filed on Nov. 6, 2018, which claims the benefit of U.S. Provisional Application No. 62/582,259, filed on Nov. 6, 2017, the contents of which are all hereby incorporated by reference herein in their entirety.

TECHNICAL FIELD

The present disclosure relates to a wireless communication system, and more specifically, to a method for transmitting data and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF INVENTION

Technical Problem

An object of the present disclosure is to provide a method for transmitting data by setting an initial value of a scrambling sequence of data in consideration of a slot index and the like.

Technical objects to be achieved by the present disclosure are not limited to the aforementioned technical objects, and other technical objects not described above may be evidently understood by a person having ordinary skill in the art to which the present disclosure pertains from the following description.

Technical Solution

In one aspect of the present disclosure, a method for transmitting data in a wireless communication system, the method performed by a base station includes scrambling bits composed of at least one codeword by using a scrambling sequence; and transmitting data including the scrambled bits to a terminal on a physical channel, wherein an initial value of the scrambling sequence is determined based on a value by floor function of a slot index and a number of slots in a radio frame.

In addition, in the present disclosure, the initial value of the scrambling sequence may be determined based on floor ((slot index)/$N_{slot}^{frame,u} \times 2^4$).

In addition, in the present disclosure, the at least one codeword may be 0 or 1.

In another aspect of the present disclosure, a base station for transmitting data in a wireless communication system, the base station includes a radio frequency (RF) module for transmitting and receiving a radio signal; and a processor configured to functionally connected with the RF module, wherein the processor is configured to scramble bits composed of at least one codeword by using a scrambling sequence; and transmit data including the scrambled bits to a terminal on a physical channel, wherein an initial value of the scrambling sequence is determined based on a value by floor function of a slot index and a number of slots in a radio frame.

Advantageous Effects

The present disclosure has an effect that the initial value of the scrambling sequence can be kept the same for a specific time period by determining the initial value of the scrambling sequence in consideration of the slot index and the number of slots in the radio frame.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included as part of the description to help understand the present disclosure, provide an embodiment of the present disclosure, and describe the technical features of the present disclosure together with the description.

FIG. 1 is a diagram illustrating an example of an overall structure of a new radio (NR) system to which a method proposed by the present disclosure may be implemented.

FIG. 2 illustrates a relationship between a UL frame and a DL frame in a wireless communication system to which a method proposed by the present disclosure may be implemented.

FIG. 3 illustrates an example of a resource grid supported in a wireless communication system to which a method proposed by the present disclosure may be implemented.

FIG. 4 is a diagram illustrating an example of a self-contained subframe structure to which a method proposed by the present disclosure may be implemented.

FIG. 7 illustrates a block diagram of a wireless communication device to which a method proposed by the present disclosure may be implemented.

FIG. 8 illustrates a block diagram of a communication device according to an embodiment of the present disclosure.

MODE FOR INVENTION

Figure 5:
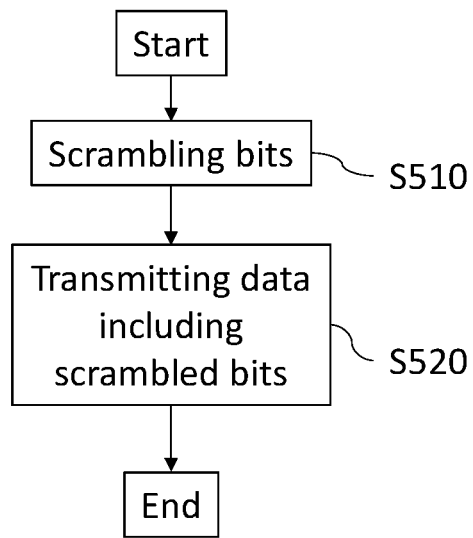
FIG. 5 is a flowchart showing an example of an operation of a base station performing a method proposed in the present disclosure.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Numerology: corresponds to one subcarrier spacing in the frequency domain. Different numerology may be defined by scaling reference subcarrier spacing by an integer N.

NR: NR Radio Access or New Radio

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/

RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_S$ before the start of a corresponding DL frame in the UE.

Regarding the numerology μ, slots are numbered in ascending order of $n_s^\mu \in \{0, \ldots, N_{subframe}^{slots,\mu} - 1\}$ in a subframe, and in ascending order of $n_{s,f}^\mu \in \{0, \ldots, N_{frame}^{slots,\mu} - 1\}$ flame m a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k, l). Herein $k = 0, \ldots, N_{RB}^\mu N_{sc}^{RB} - 1$ is an index in the frequency domain, and $\bar{l} = 0, \ldots, 2^\mu N_{symb}^{(\mu)} - 1$ indicates a location of a symbol in a subframe, To indicate a resource element in a slot, the index pair (k,Ī) is used. Herein, Ī=0, . . . , $N_{symb}^{\mu}-1$.

The resource element (k,Ī) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,Ī) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Data Scrambling

Hereinafter, data scrambling for DL data defined in LTE will be described.

For each codeword q, the block of $b^{(q)}(0)$, . . . , $b^{(q)}(M_{bit}^{(q)}-1)$ bits is scrambled prior to modulation, and as a result, is a block of scrambled bits $\tilde{b}^{(q)}(0)$, . . . , $\tilde{b}^{(q)}(M_{bit}^{(q)}-1)$ according to $\tilde{b}^{(q)}(i)=(b^{(q)}(i)+c^{(q)}(i))$ mod 2.

Here, $M_{bit}^{(q)}$ bit is the number of bits in the codeword q transmitted on a physical channel in one subframe/slot/subslot.

Here, a scrambling sequence $c^{(q)}(i)$ is given by 3GPP TS 36.211 7.2.

A scrambling sequence generator should be initialized at a start of each subframe, and an initialization value of $c_{init}$ depends on a transmission channel type according to Equation 2 below.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases} \quad \text{[Equation 2]}$$

Here, nRNTI corresponds to RNTI associated with PDSCH transmission described in Section 3GPP TS 36.213 7.1.

Up to two codewords can be transmitted in one subframe. That is, it is q∈{0,1}.

For single codeword transmission, q is equal to zero.

UL data is also scrambled similarly to DL data, since there is only one codeword (CW), the $c_{init}$ value is set as in Equation 3 below.

$$c_{init}=n_{RNTI}\cdot 2^{14}+\lfloor n_s/2 \rfloor \cdot 2^9+N_{ID}^{cell}; \quad \text{[Equation 3]}$$

As described above, when using a 31-Gold sequence to generate the scrambling sequence, the $c_{init}$ value must be expressed in 31 bits.

Hereinafter, a method for generating $c_{init}$ that satisfies 31 bits in NR (new radio or NR radio access) proposed in the present disclosure will be described.

A physical cell ID (PCID) proposed in the present disclosure may be replaced by any 10 bits scrambling ID that is UE specific configured through RRC signaling. In this case, the scrambling ID is defined as the physical cell ID by default before RRC configure, and defined as the configured value after RRC configure.

In addition, the nRNTI is a value represented by 16 bits and may be defined as one of various Radio Network Temporary Identifiers (RNTIs) such as C-RNTI, RA-RNTI, and P-RNTI, and is determined by the RNTI value used as a cyclic redundancy check (CRC) check of DCI.

q means a codeword index and has a value of 0 or 1.

A^B means A to the power B, and % means a modular operation. A slot index means a slot index defined in one radio frame, and a symbol index means a symbol index defined in one slot. In Equations to be described later, ceiling and floor mean raising and lowering to adjacent integers, respectively.

The methods proposed in the present disclosure may be used in a method for generating scrambling $c_{init}$ of DL data, and may also be used in a method for generating scrambling $c_{init}$ of UL data.

As described above, the UL data may be used by fixing q=0 as the codeword is limited to 1, and replaced by modular 2^5 instead of modular 2^4 in the proposed equation by using 1 bit assigned to q for a time index.

Alternatively, in the proposed equation, it may be replaced by floor [x*2^5] instead of floor [x*2^4], and x is set to a value corresponding to each proposal as a variable.

It is assumed that remaining parameters except for a time index (e.g. slot index or symbol index) are expressed in a combination of 0 to 2^27-1 among various parameters for generating $c_{init}$ proposed in the present disclosure.

However, the method proposed in the present disclosure is not limited to this, and may be used even when the remaining parameters except for the time index (e.g. slot index or symbol index) are expressed in a combination of 0 to 2^M-1.

In this case, modularity for the time index is applied by being replaced by 2^(31-M) instead of 2^4.

Alternatively, in the method proposed in the present disclosure, it may be used by generalizing to modular 2^K instead of modular 2^4, and the K value may be indicated by the base station to the terminal (e.g. UE) through the RRC signaling within a range of 0 to 31-M.

Similarly, it may be applied by being replaced by floor [x*2^(31−M)] instead of the floor [x*2^4] proposed in the present disclosure, or used by generalizing to floor [x*2^K].

Hereinafter, various methods for generating $c_{init}$ proposed in the present disclosure will be described in more detail.

(Method 1)

Method 1 is a method for generating $c_{init}$ using Equation 4 below.

$$C\text{init}=n\text{RNTI}*2^{15}+q*2^{14}+[(\text{slot index})\%2^4]*2^{10}+\text{physical cell ID} \quad \text{[Equation 4]}$$

It occurs when the slot index exceeds the range of 0 to 15 according to the numerology, and in this case, a value obtained by modularizing the slot index to 2^4 is used to change the $c_{init}$ according to the time (e.g. slot) index within 4 bits (4=31−27, 27 bits out of a total of 31 bits are used for the combination of the remaining parameters (e.g. nRNTI, q, physical cell ID) except for the time index, so the remaining 4 bits can be used by assigning to the time index).

If q is excluded as a parameter of $c_{init}$, since the remaining 5 bits of 31 bits may be used for the time index, in Equation 4, (slot index)% 2^4 may be expressed as (slot index)% 2^5 instead, in Equation 4, q=0 is fixed.

As the subcarrier spacing increases, the number of slots composed of one radio frame increases. As the number of slots composed of one radio frame increases, the $c_{init}$ value may be repeated multiple times in one radio frame due to (slot index)% 2^4.

This repetition reduces the ability to randomize interference between codewords. Therefore, when the number of slots (or the number of OFDM symbols) composed of one radio frame is L or more, this repetition frequency may be reduced by excluding some of the remaining parameters except for the time index from the $c_{init}$ setting or fixing them to a single value (or such as taking a modular to the time index, the modular operation is performed on some parameters to reduce the number of bits used for the $c_{init}$) and assigning more bits to the slot index.

For example, if the number of slots composed of one radio frame is 20 or more, q is fixed to 0, or q is not used for $c_{init}$ generation and (slot index)% 2^5 is taken, so that the frequency of repetitions can be reduced.

It is obvious that this method can be used not only in Method 1 but also in other proposed methods.

(Method 2)

Method 2 is a method for generating $c_{init}$ using Equation 5 below.

$$C\text{init}=n\text{RNTI}*2^{15}+q*2^{14}+[\text{symbol index within a slot}]*2^{10}+\text{physical cell ID} \quad \text{[Equation 5]}$$

Method 2 generates $c_{init}$ using the symbol index instead of the slot index.

The symbol index may be expressed within 4 bits, so the modular operation is unnecessary. As the $c_{init}$ varies according to the symbol index, the scrambling is possible in a finer unit in the time domain.

As a result, when non-slot based scheduling occurs, when the UE receives the non-slot based scheduling multiple times within one slot, since scrambling of interference data changes for each non-slot based scheduling, that is, for each symbol, it has the advantage of effectively randomizing interference between codewords.

However, since Method 2 shows the same $c_{init}$ value repeatedly for each slot compared to Method 1, interference randomization is inferior to the slot-based scheduling.

(Method 3)

Method 3 is a method for generating $c_{init}$ using Equation 6 below.

$$C\text{init}=n\text{RNTI}*2^{15}+q*2^{14}+[(\text{symbol index within a slot}+N_{symb}^{slot}*\text{slot index})\%2^4]*2^{10}+\text{physical cell ID} \quad \text{[Equation 6]}$$

In Method 3, the $c_{init}$ value is determined according to the symbol index composed of one radio frame.

For example, if one radio frame is composed of 10 slots, 140 symbol indexes exist.

The symbol index is limited to 4 bits, and is used as a parameter composed of chin, but as previously discussed, may increase the interference randomization over time by reducing the number of bits of other parameters composed of $c_{init}$, and by assigning more bits to the symbol index (that is, by increasing a modular value to a value greater than 2^4).

(Method 4)

Method 4 is a method for generating $c_{init}$ using Equation 7 below.

$$C\text{init}=n\text{RNTI}*2^{(11+\text{ceiling}(\log 2(K1))+\text{ceiling}(\log 2(K2)))}+q*2^{(10+\text{ceiling}(\log 2(K1))+\text{ceiling}(\log 2(K2)))}+(\text{symbol index within a slot }\%K1)*2^{(10+\text{ceiling}(\log 2(K2)))}+(\text{slot index }\%K2)*2^{10}+\text{physical cell ID} \quad \text{[Equation 7]}$$

In Equation 7, ceiling (log 2 (K1))+ceiling ((log 2 (K2)) is configured by the base station to the UE so as not to exceed 4, and may be typically set to be semi static through the RRC signaling.

Before the RRC configure, K1 and K2 values are fixed as default values.

For example, when K1=1, K2=2 ^4 are used as the default values, it is the same as Method 1, and when K2=1, K1=2 ^4 are used, it is the same as Method 2.

In Method 4' to be described later, K1 and K2 may be operated in the same way.

More preferably, when the remaining parameters other than the time index among the parameters used for $c_{init}$ have a combination of 2^M or less, the base station may be set as a terminal so that ceiling ((log 2 (K1))+ceiling ((log 2 (K2)) does not exceed 31−M. When K1=1, K2=2^(31−M) are used as the default values, it is the same as Method 1, and when K2=1, K1=2^(31−M) are used, it is the same as Method 2.

In Method 4' to be described later, K1 and K2 may be operated in the same way.

Alternatively, in Methods 1 to 4, the time index may be composed of the highest most significant bit (MSB) to generate $c_{init}$. The $c_{init}$ reflecting this is generated as in Equations 8 to 11 below.

$$C\text{init}=[(\text{slot index})\%2^4]*2^{27}+n\text{RNTI}*2^{11}+q*2^{10}+\text{physical cell ID} \quad \text{[Equation 8]}$$

$$C\text{init}=[\text{symbol index within a slot}]*2^{27}+n\text{RNTI}*2^{11}+q*2^{10}+\text{physical cell ID} \quad \text{[Equation 9]}$$

$$C\text{init}=[(\text{symbol index within a slot}+N_{symb}^{slot}*\text{slot index})\%2^4]*2^{27}+n\text{RNTI}*2^{11}+q*2^{10}+\text{physical cell ID} \quad \text{[Equation 10]}$$

$$C\text{init}=(\text{symbol index within a slot }\%K1)*2^{(27+\text{ceiling}(\log 2(K2)))}+(\text{slot index }\%K2)*2^{27}+n\text{RNTI}*2^{11}+q*2^{10}+\text{physical cell ID} \quad \text{[Equation 11]}$$

When the time index becomes larger than a specific value (e.g. larger than 2 ^4−1), Methods 1 to 4 are a method for increasing from the time index 0 again by the modular operation, the time index maintains a range from 0 to the specific value, and is reflected in the generation of the $c_{init}$. As a result, the $c_{init}$ is set to a repeating value with a time period.

In a different way, by setting a period of the time index (e.g. D), the $c_{init}$ may be set to be maintained at a specific value during the D period, and to be maintained at a different value during the next D period. For example, it is possible to consider a way in which the same $c_{init}$ is generated from 0 to D−1 hours, the same $c_{init}$ is generated with a new value from D to 2D−1 hours, and the same $c_{init}$ is generated with a new value from 2D to 3D−1 hours.

As a result, one radio frame is divided into multiple exclusive D durations, and different $c_{init}$ values are set for each D duration, and the same $c_{init}$ value is maintained regardless of the time index change during the D duration.

If this is applied, the above-described Methods 1, 2, 3 and 4 may be changed to Methods 1', 2', 3' and 4', respectively.

(Method 1')

Method 1' is a method for generating $c_{init}$ using Equation 12 below.

$C\text{init}=n\text{RNTI}*2^{\wedge}15+q*2^{\wedge}14+\text{floor}[(\text{slot index})/\text{Nslotframe},u*2^{\wedge}4]*2^{\wedge}10+\text{physical cell ID}$    [Equation 12]

(Method 2')

Method 2' is a method for generating $c_{init}$ using Equation 13 below.

$C\text{init}=n\text{RNTI}*2^{\wedge}15+q*2^{\wedge}14+\text{floor}[\text{symbol index within a slot}/(N_{symb}^{slot})*2^{\wedge}4]*2^{\wedge}10+\text{physical cell ID}$    [Equation 13]

(Method 3')

Method 3' is a method for generating $c_{init}$ using Equation 14 below.

$C\text{init}=n\text{RNTI}*2^{\wedge}15+q*2^{\wedge}14+\text{floor}[(\text{symbol index within a slot}+N_{symb}^{slot}*\text{slot index})/(N_{symb}^{slot}*\text{Nslotframe},u)*2^{\wedge}4]*2^{\wedge}10+\text{physical cell ID}$    [Equation 14]

(Method 4')

Method 4' is a method for generating $c_{init}$ using Equation 15 below.

$C\text{init}=n\text{RNTI}*2^{\wedge}(11+\text{ceiling}(\log 2(K1))+\text{ceiling}(\log 2(K2)))+q*2^{\wedge}(10+\text{ceiling}(\log 2(K1))+\text{ceiling}(\log 2(K2)))+\text{floor}[\text{symbol index within a slot}/(N_{symb}^{slot})*K1]*2^{\wedge}(10+\text{ceiling}(\log 2(K2)))+\text{floor}[\text{slot index}/(\text{Nslotframe},u)*K2]*2^{\wedge}10+\text{physical cell ID}$    [Equation 15]

In Method 1', when a specific condition is satisfied, the slot index may be used instead of floor [(slot index)/Nslotframe, u*2^4], and the specific condition may be set when Nslotframe,u satisfies a value of 16 or less.

Alternatively, in Methods 1', 2', 3', and 4', the time index may be composed of the highest MSB to generate $c_{init}$. The $c_{init}$ reflecting this is generated as shown in the following Equations 16 to 19, respectively.

$C\text{init}=\text{floor}[(\text{slot index})/\text{Nslotframe},u*2^{\wedge}4]*2^{\wedge}27+n\text{RNTI}*2^{\wedge}11+q*2^{\wedge}10+\text{physical cell ID}$    [Equation 16]

$C\text{init}=[\text{symbol index within a slot}]*2^{\wedge}27+n\text{RNTI}*2^{\wedge}11+q*2^{\wedge}10+\text{physical cell ID}$    [Equation 17]

$C\text{init}=\text{floor}[(\text{symbol index within a slot}+N_{symb}^{slot}*\text{slot index})/(N_{symb}^{slot}*\text{Nslotframe},u)*2^{\wedge}4]*2^{\wedge}27+n\text{RNTI}*2^{\wedge}11+q*2^{\wedge}10+\text{physical cell ID}$    [Equation 18]

$C\text{init}=\text{floor}[\text{symbol index within a slot}/(N_{symb}^{slot})*K1]*2^{\wedge}(27+\text{ceiling}(\log 2(K2)))+\text{floor}[\text{slot index}/(\text{Nslotframe},u)*K2]*2^{\wedge}27+n\text{RNTI}*2^{\wedge}11+q*2^{\wedge}10+\text{physical cell ID}$    [Equation 19]

As another embodiment, by combining Method 4 and Method 4', Method 4" may be applied to generate $c_{init}$ proposed in the present disclosure.

That is, one of the symbol index and the slot index is used to generate $c_{init}$ through floor function as in Method 4', and the other one is used to generate $c_{init}$ through the modular operation as in Method 4.

FIG. 5 is a flowchart showing an example of an operation of a base station performing a method proposed in the present disclosure.

First, a base station scrambles bits composed of at least one codeword by using a scrambling sequence (S510).

The at least one codeword may be 0 or 1.

Then, the base station transmits data including the scrambled bits to a terminal on a physical channel (S520).

Here, an initial value ($c_{init}$) of the scrambling sequence may be determined based on a value by floor function of the slot index and the number of slots in the radio frame.

More specifically, the initial value of the scrambling sequence may be determined based on floor((slot index)/$N_{slot}^{frame,u} \times 2^4$).

More specifically, the initial value of the scrambling sequence may be determined based on the above-described Equation 8.

With reference to FIGS. 5 to 8, the method proposed in the present disclosure will be described with respect to a part implemented in the base station.

In order to transmit data in a wireless communication system, the base station may include a radio frequency (RF) module for transmitting and receiving radio signals and a processor functionally connected to the RF module.

The processor of the base station may control the bits composed of at least one codeword to be scrambled using the scrambling sequence.

In addition, the processor of the base station may control the RF module to transmit the data including the scrambled bits to the terminal on the physical channel.

The initial value of the scrambling sequence may be determined based on a value by floor function of the slot index and the number of slots in the radio frame.

More specifically, the initial value of the scrambling sequence may be determined based on floor((slot index)/$N_{slot}^{frame,u} \times 2^4$).

More specifically, the initial value of the scrambling sequence may be determined based on the above-described Equation 8.

Figure 6:
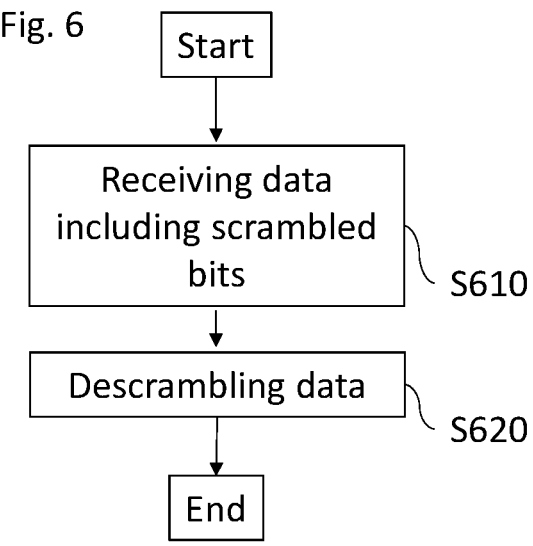
FIG. 6 is a flowchart showing an example of an operation of a terminal performing a method proposed in the present disclosure.

FIG. 6 is a flowchart showing an example of an operation of a terminal performing a method proposed in the present disclosure.

A terminal receives data including scrambled bits from a base station on a physical channel (S610) and descrambles the data (S620).

Here, the scrambled bits may be scrambled using a scrambling sequence.

Here, an initial value ($c_{init}$) of the scrambling sequence may be determined based on a value by floor function of the slot index and the number of slots in the radio frame.

More specifically, the initial value of the scrambling sequence may be determined based on floor((slot index)/$N_{slot}^{frame,u} \times 2^4$).

More specifically, the initial value of the scrambling sequence may be determined based on the above-described Equation 8.

With reference to FIGS. 6 to 8, the method proposed in the present disclosure will be described with respect to a part implemented in the terminal.

In order to receive data in a wireless communication system, the terminal may include a radio frequency (RF) module for transmitting and receiving radio signals and a processor functionally connected to the RF module.

The processor of the terminal may control the RF module to receive the data including the scrambled bits from the base station on the physical channel.

Here, the scrambled bits may be scrambled using the scrambling sequence.

Here, the initial value ($c_{init}$) of the scrambling sequence may be determined based on a value by floor function of the slot index and the number of slots in the radio frame.

More specifically, the initial value of the scrambling sequence may be determined based on floor((slot index)/$N_{slot}^{frame,u} \times 2^4$.

More specifically, the initial value of the scrambling sequence may be determined based on the above-described Equation 8.

Overview of Devices to which the Present Disclosure can be Applied

FIG. 7 illustrates a block diagram of a wireless communication device to which methods proposed in the present disclosure can be applied.

Referring to FIG. 7, a wireless communication system includes a base station 710 and a plurality of terminals 720 located in a base station region.

The base station and the terminal each may be represented by wireless devices.

The base station includes a processor 711, a memory 712, and a radio frequency (RF) module 713. The processor 711 implements the functions, processes and/or methods proposed in FIGS. 1 to 6 above. Layers of wireless interface protocol may be implemented by the processor. The memory, being connected to the processor, stores various types of information for driving the processor. The RF module, being connected to the processor, transmits and/or receives radio signals.

The UE includes a processor 721, a memory 722, and an RF module 713.

The processor implements the functions, processes and/or methods proposed in FIGS. 1 to 6 above. Layers of a wireless interface protocol may be implemented by the processor. The memory, being connected to the processor, stores various types of information for driving the processor. The RF module, being connected to the processor, transmits and/or receives radio signals.

The memory 712, 722 can be installed inside or outside the processor 711, 721 and connected to the processor through various well-known means.

In addition, the base station and/or the UE may have a single antenna or multiple antennas.

The antennas 714 and 724 function to transmit and receive wireless signals.

FIG. 8 illustrates a block diagram of a communication device according to an embodiment of the present disclosure.

Particularly, FIG. 8 illustrates the UE of FIG. 7 above in more detail.

Referring to FIG. 8, the UE includes a processor (or digital signal processor (DSP)) 810, an RF module (or RF unit) 835, a power management module 805, an antenna 840, a battery 855, a display 815, a keypad 820, a memory 830, a subscriber identification module (SIM) card 825 (which may be optional), a speaker 845 and a microphone 850. The UE may include a single antenna or multiple antennas.

The processor 810 may be configured to implement the functions, processes and/or methods proposed in FIGS. 1 to 6 above. Layers of a wireless interface protocol may be implemented by the processor.

The memory 830 is connected to the processor and stores information related to operations of the processor. The memory may be located inside or outside the processor and may be connected to the processor through various well-known means.

A user enters command information, such as a telephone number, for example, by pushing (or touching) buttons of the keypad 820 or by voice activation using the microphone 850. The processor receives the command information and processes to perform the appropriate function, such as to dial the telephone number. Operational data may be extracted from the SIM card 825 or the memory 830. Furthermore, the processor may display the command information or operational information on the display 815 for the user's recognition and convenience.

The RF module 835 is connected to the processor to transmit and/or receives an RF signal. The processor forwards the command information to the RF module, to initiate communication, for example, to transmit radio signals comprising voice communication data. The RF module is comprised of a receiver and a transmitter for receiving and transmitting radio signals. The antenna 840 functions to transmit and receive radio signals. Upon receiving the radio signals, the RF module may forward the signal for processing by the processor and convert the signal to baseband. The processed signals may be converted into audible or readable information output via the speaker 845.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The method for transmitting data in the wireless communication system of the present disclosure has been mainly described with reference to the example applied to the 3GPP LTE/LTE-A system and the 5G system (New RAT system), but can be applied to various wireless communication systems.

The invention claimed is:

1. A method for transmitting data in a wireless communication system, the method performed by a base station comprising:
scrambling bits composed of at least one codeword by using a scrambling sequence; and
transmitting data including the scrambled bits to a terminal on a physical channel,
wherein an initial value of the scrambling sequence is determined based on a value by floor function of a slot index and a number of slots in a radio frame, and
wherein the initial value of the scrambling sequence is determined based on floor((slot index)/$N_{slot}^{frame,u} \times 2^4$).

2. The method of claim 1, wherein the initial value of the scrambling sequence is determined based on the following equation, $$C_{init} = n\text{RNTI} \times 2^{15} + q \times 2^{14} + \text{floor}[(\text{slot index})/N_{slot}^{frame,u} \times 2^4)] \times 2^{10} + \text{PCID}.$$

3. The method of claim 1, wherein the at least one codeword is 0 or 1.

4. A base station for transmitting data in a wireless communication system, the base station comprising:
a radio frequency (RF) module for transmitting and receiving a radio signal; and
a processor configured to functionally connected with the RF module,
wherein the processor is configured to:
scramble bits composed of at least one codeword by using a scrambling sequence; and
transmit data including the scrambled bits to a terminal on a physical channel,
wherein an initial value of the scrambling sequence is determined based on a value by floor function of a slot index and a number of slots in a radio frame, and
wherein the initial value of the scrambling sequence is determined based on floor((slot index)/$N_{slot}^{frame,u} \times 2^4$).

5. The base station of claim 4, wherein the initial value of the scrambling sequence is determined based on the following equation, $$C_{init} = n\text{RNTI} \times 2^{15} + q \times 2^{14} + \text{floor}[(\text{slot index})/N_{slot}^{frame,u} \times 2^4)] \times 2^{10} + \text{PCID}.$$

6. The base station of claim 4, wherein the at least one codeword is 0 or 1.

* * * * *